US 8,063,750 B2

(12) United States Patent
Knibbe

(10) Patent No.: US 8,063,750 B2
(45) Date of Patent: Nov. 22, 2011

(54) AUTONOMOUS LIMITED NETWORK REALIZATION AND COMMISSIONING

(75) Inventor: Engel Johannes Knibbe, Heeze (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 267 days.

(21) Appl. No.: 12/303,760

(22) PCT Filed: Jun. 19, 2007

(86) PCT No.: PCT/IB2007/052340
§ 371 (c)(1),
(2), (4) Date: Dec. 8, 2008

(87) PCT Pub. No.: WO2008/001267
PCT Pub. Date: Jan. 3, 2008

(65) Prior Publication Data
US 2010/0231363 A1 Sep. 16, 2010

(30) Foreign Application Priority Data
Jun. 29, 2006 (EP) ..................................... 06116292

(51) Int. Cl.
*H04L 29/08* (2006.01)
(52) U.S. Cl. ............. 340/286.02; 340/286.01; 340/4.21; 340/5.2; 340/5.21; 370/254; 370/258; 455/41.2
(58) Field of Classification Search ............. 340/286.02, 340/825, 5.21, 3.03, 3.43, 286.1, 4.21, 9.1–9.17; 315/291; 370/254, 258; 455/41.2
See application file for complete search history.

(56) References Cited

U.S. PATENT DOCUMENTS

| 6,919,790 B2 * | 7/2005 | Kanazawa ................... 340/5.21 |
| 2003/0057887 A1 | 3/2003 | Dowling et al. |
| 2004/0201448 A1 * | 10/2004 | Wang ........................... 340/3.43 |
| 2005/0201300 A1 | 9/2005 | Bridgelall |
| 2006/0044152 A1 | 3/2006 | Wang |

FOREIGN PATENT DOCUMENTS

| EP | 1411671 A1 | 4/2004 |
| WO | 2004057927 A1 | 7/2004 |
| WO | 2005096677 A1 | 10/2005 |
| WO | 2006095315 A1 | 9/2006 |
| WO | 2006095316 A1 | 9/2006 |

* cited by examiner

Primary Examiner — George Bugg
Assistant Examiner — Sisay Yacob
(74) Attorney, Agent, or Firm — Mark L. Beloborodov

(57) ABSTRACT

Systems and methods for forming a local network (150) include determining which controllable (120) and controlling (170, 180) devices are located within a local area (110). A controller (130) is configured to communicate with the controllable and controlling devices and to include local devices to the local network (150) associated with the local area, while preventing remaining devices from being associated with the local network. The controller may be further configured to automatically reconfigure itself and/or the local controlling device(s) to properly be commissioned to control the local controllable device(s), such as based on the number and/or type of the local controlling devices allowed to join the local network. The controller distinguishes and determines the local controllable and controlling devices by RF signals, IR signals and/or sonar signals, such as based on time of flight and received signal strength of the RF signals.

12 Claims, 1 Drawing Sheet

AUTONOMOUS LIMITED NETWORK REALIZATION AND COMMISSIONING

Figure 1:
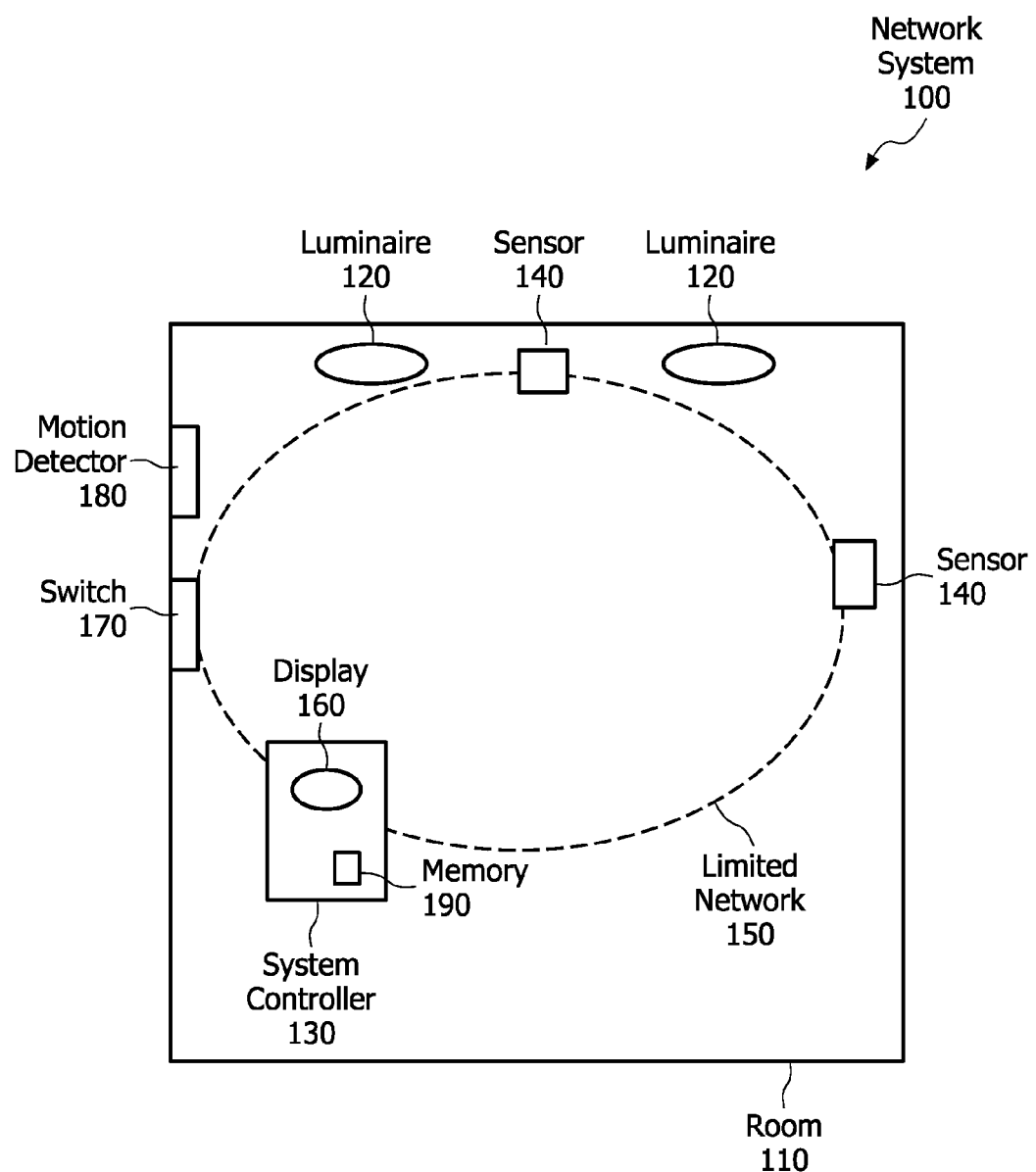

This application is a national stage application under 35 U.S.C. §371 of International Application No. PCT/IB2007/052340 filed on Jun. 19, 2007, and published in the English language on Jan. 3, 2008, as International Publication No. WO/2008/001267, which claims priority to European Application No. 06116292.1 filed on Jun. 29, 2006, incorporated herein by reference.

The present invention relates to an autonomous limited network realization where devices within a local area are detected and included in a limited network, while device outside the local area are prevented from joining the limited network. Based on the devices allowed to join the limited network, controlling devices such as sensors, switches and/or controllers of the limited network are automatically configured or commissioned to properly operate and control controllable devices of the limited network.

In typical mesh forming RF networks, all devices active and within range are gathered into a network when a coordinator starts up a network. Network forming can be influenced by security measures or pre-definition of which devices are allowed to join. Forming a typical network requires a predefinition of identifications (IDs) or keys of devices that are included in the network. Further, forming such a network requires complicated user interaction, i.e., manually forming the limited network under the control of a skilled person using relatively complicated procedure, often requiring a trained installer or administrator. Thus, laymen or typical consumers often shy away from forming and configuring such networks, and hire professionals thus increasing cost.

In various applications, the network should not link all available devices, but should limit itself to the relevant devices for the application. One way of achieving forming a limited network is to only power up devices that should form or be included in the limited network. This is an effective method, but requires human interaction.

Requiring human interaction is a burden especially for battery-powered devices, as devices often cannot be installed and properly configured when practical for the installer, but need to be configured or their batteries inserted when the specific network is going to be formed. Further, mains or AC powered devices (that are either directly connected to mains or plugged into a wall outlet) need to be on separate mains-groups, so that only these are powered on from a common mains-group or AC power circuit when formation of the network is started. Thus, advance knowledge is required of which devices are to be associated with networks, and which limited networks are going to be formed. Further, the desired devices with mains plugs need to be plugged into the correct AC power outlets manually (similar to battery operated devices) when the specific network is going to be formed.

An example of a limited network includes a local room network, such as private office, conference room, corridor, etc. In general, limited networks are desired when a separation of functions is practical. For lighting applications, one reason for limited networks is to provide the choice of automatic configuration, thus eliminating or reducing the complexity of the usual commissioning of light fixtures or luminaries including light sources and associating them with a particular controller(s), switch(es) and/or sensor(s).

Accordingly there is a need for a system that allows better limited network formation, with reduced complexity and increased autonomy.

One object of the present systems and methods is to overcome the disadvantage of forming limited networks.

This and other objects are achieved by systems and methods for forming a network comprising controllable devices, wherein at least one of the controllable devices is located within a local area. A controller is configured to communicate with the controllable devices and to include the at least one controllable device to a local network associated with the local area, while preventing remaining controllable devices, which are still within communication range of the local network but are outside the local area, from being associated with the local network. Other controlling devices, when present in the local area, may be included in the local network and are configured to control the controllable devices located within the local area that are part of, or allowed to join, the local network.

The controller may be further configured to automatically reconfigure itself, and/or at least one controlling device which is included in the local network, to control the at least one controllable device, such as based on the number and/or type of the controlling devices allowed to join the local network.

The controller may be configured to distinguish the controllable and controlling devices that are in the local area by at least one of RF signals, visible signals such as visible light signals, IR signals and sonar signals communicated between the controller and the controllable and controlling devices. For RF signals, the determination of which controllable and controlling devices are present in the local area may be based on time of flight and/or received signal strength of the RF signals.

Further areas of applicability of the present systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

These and other features, aspects, and advantages of the apparatus, systems and methods of the present invention will become better understood from the following description, appended claims, and accompanying drawing where:

FIG. 1 shows limited network system according to one embodiment of the present invention.

The following description of certain exemplary embodiment(s) is merely exemplary in nature and is in no way intended to limit the invention, its application, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed system and it is to be selection understood that other embodiments may be utilized and that structural and logical changes may be made without departing from the spirit and scope of the present system.

The following detailed description will be described in the context of a lighting application in a structure having rooms such as an office building, for example. However, neither the lighting context nor the office building context is to be taken in a limiting sense, and the scope of the present system is defined only by the appended claims. Moreover, for the purpose of clarity, detailed descriptions of well-known devices, circuits, and methods are omitted so as not to obscure the description of the present system.

In an office building, there are typically various areas such as office rooms, conference rooms, corridors, and open plan areas. The functionality of these areas should ideally adapt with the available lighting systems including luminaires or light sources, sensors, controllers and switches. The offices are typically separated by walls and doors that may be closed. The corridor is also separated by a wall (often with closed doors) from the open plan office. When the limited networks are formed with limited range and low-power, for example, separate networks may be formed for the different local areas, such as areas that are fully or partially enclosed or surrounded by walls. Using only the devices within an enclosed or semi-enclosed area or space, a lighting application included in a system controller, such as for controlling the light sources or luminaires located within this particular space may be based upon the sensors and switches available in the particular space.

FIG. 1 shows a network system 100 in a room 110 having luminaries or light fixtures 120, which include at least one light source and a controller, such as a ballast, as well as a transceiver for communication with one or more switches or a system controller(s) 130 including light switches or controllers 170 mounted on a wall, and/or portable devices such as remote controllers, personal digital assistants (PDA's) or mobile/cellular telephones or any other user interface (UI), for example. As is well known in the art and in addition to a transceiver, the controller 130, light sources or fixtures 120 and any other devices or sensors that may be configured to be associated with the lighting system such as the switch(es) 170, a motion sensor(s) 180 and/or UI's, may include modulators and demodulators or decoders, converters such as analog to digital converters, digital to analog converters, and other converters to convert radio frequency (RF) signals to baseband signals, optionally through intermediate signals, and any other elements suitable for communicating and analyzing signals. Such transceivers and associated communication elements may be embedded in the system and light controllers, ballasts, sensors, switches, motion sensors, UI's and the like. It should be noted that the system controller(s) 130 need not be a separate unit and may be incorporated within other elements, such as electronic ballasts, drivers or controllers associated with at least one of the light sources 120.

In one embodiment, the limited network system in a particular area is formed as follows:

Luminaire(s) 120, sensor(s) 140, UI(s) 130 such as a local (room) or master (floor or building) system controller, and other associated elements such as a switch(es) 170 and motion sensor(s) 180, are installed normally. Upon power up, which may be the power up for a whole building (e.g., floor by floor), the individual room system controller 130 and ballasts or light controllers associated with the light sources 120 will form a limited network 150 using, for example, sensors 140 that are configured for detection of power of received signals (often referred to as RSSI), signal time of flight detection and/or wall detection as will be described. The sensors 140 may be used to determine which devices are within the room 110, including relatively precise locations thereof using various methods such as triangulation.

The sensors 140 may not be needed, particularly in the case where the UI or system controller 130 is configured to detect devices within the room 110 base on received signal strength indicator (RSSI) alone or in combination with signal time of flight (ToF) an/or direction of arrival (DoA) to triangulate or determine the position of controlling and controllable elements in the room 110, as described in European Patent Application Serial Number 05101928.9, first filed Mar. 11, 2005, and later filed on Mar. 8, 2006 as International Application Number PCT/IB2006/050717 entitled "Wall Finding for Wireless Lighting Assignment" which are incorporated herein by reference in their entirety; and European Patent Application Serial Number 05101929.7, first filed Mar. 11, 2005, and later filed on Mar. 8, 2006 as International Application Number PCT/IB2006/050720 entitled "Grouping Wireless Lighting Nodes According to a Building Room Layout" which are incorporated herein by reference in their entirety.

For example, a first map of the room topology is obtained using RSSI signals between the system controller 130 and another device, such as the luminaire, 120, switch 170 or motion detector 180. The RSSI signals indicate distance between the communicating elements as RSSI declines with increasing distance. However, walls typically reduce the RSSI signals, i.e., attenuate the level of RF signals, by absorption and/or dispersion. Thus, object on the other side of a wall appear to be further away then actual. To more accurately determine the relative spatial positions of communicating elements, a second room topology map may be obtained using ToF values which also indicate distance. The ToF of RF signals (which also increase with increasing distance) is little affected, if any, by walls, and thus provides a relatively accurate estimate of distances between the communicating nodes or elements.

By comparing network or room topology obtained by RSSI-ranging with the topology obtained by ToF-ranging the location of walls and partitions between communicating elements may be determined, as well as the relative location of the communicating elements themselves. Triangulation, multilateration and/or trilateration may also be used based on signals exchanged between the system controller 130 and at least two sensors 140 having transceivers that are synchronized with the system controller 130. As is well known, multilateration uses measurements of time difference of arrival, rather than time of arrival, to estimate location using the intersection of hyperboloids; while trilateration determines the relative positions of objects using the geometry of triangles, similar to triangulation. Unlike triangulation, which uses angle measurements (together with at least one known distance) to calculate the location of an element, trilateration uses the known locations of two or more reference points, and the measured distance between the subject element and each reference point.

Any other method to determine wall and/or element location may be used, such as using a number of light measuring cells particularly positioned, such as at four corners of a square or rectangle, to receive light emitted by light sources 120 and determined their spatial positions, as described in International Publication Number WO 2005/096677, entitled "Device for Lighting a Room," which is incorporated herein by reference in it entirety. International Publication Number WO 2004/057927, entitled "Method of Configuration a Wireless-Controlled Lighting System," is also incorporated herein by reference in it entirety, and describes associating a group of lighting units to a button on a remote control, upon reception of ID codes from the lighting units and activation of the remote control button, for example.

Only devices, such as the light sources 120 or any other device with communication means inside a desired space, enclosed or surrounded by wall for example, are allowed to join the limited network which is associated with the desired space. The light sources or luminaries within the desired space may be detected via combining time of flight with received signal strength of signals communicated wirelessly between system controller(s) 130 and the light sources 120, for example. Alternatively or in addition to, messages signals, such as signals having luminaire IDs attempting to register with or join the limited network 150, received with a lower power than other similar signals may be ignored.

For example, when two signals have substantially similar time of arrival or time of flights indicating being at a similar distance from the system controller 130, then signal with a lower received signal level may be ignored, as it may originate from a luminaire in a different room where the signal is attenuated by objects between the luminaire and the controller, such as walls and wall fixtures that may attenuate or reflect RF energy, thus lowering the signal level received the system controller 130, and indicating that this luminaire may be in a different room.

In its simplest form, the controller of each luminaire 120 includes its location information in addition to a unique ID and transmits its ID and location to the system controller 130. The system controller 130 includes information regarding the building, such as floor maps, and thus may associate or correlate the received luminaire location with the particular room 110. The unique luminaire ID may be stored in a memory of the luminaire by the manufacturer for example, or may be randomly generated and assigned to the luminaire by the system controller 130, or a building master controller. The location of the luminaire may be stored in the luminaire memory upon installation of the luminaire in the particular location, such as by the installer or administrator of the building master controller.

Of course, automatic location detection may be used to detect the location of each luminaire 120, such as by triangulation. Triangulation determines luminaire location from a signal transmitted by the luminaire and received by three transceivers of the controller 130 or associated with the controller, such as the sensors 140 which may include transceivers, for example, and report to the controller 130 received signals from the luminaire 120. In turn, using information related to a signal transmitted by the luminaire 120 and received by at least transceivers located at there different position in the room 110, the system controller 130 determines the location of the luminaire 120.

Another automatic luminaire location detection may be detecting the power of signals received from the luminaire 120. Knowing the transmitted power or level, which may be communicated to the system controller 130 by the luminaire 120, for example, or may be a standard known transmit power, then the level received of signals below a predetermined threshold may be ignored. Such signals are ignored, and the luminaire transmitting this low level signal (as determined by the luminaire ID included in the signal) is not allowed to join the limited network 110, since the low received signal level indicates that the transmitting luminaire is either far away or is obstructed by signal interfering objects such as wall and wall fixtures, thus indicating that the transmitting luminaire is not in the room 110.

One skilled in the art would know from the current disclosure that various other means may be used to automatically detect luminaire locations. For example, sound waves may be used to communicate between the luminaire 120 and the system controller 130, which are even more attenuated or blocked by walls, thus preventing luminaries outside the room 110 from joining the limited network, either since such sound signals are not received by the system controller 110 or are received at level below a predetermined threshold and are thus ignored.

Further, line of sight measurements may be used, such as using infrared (IR) signals to communicate between the system controller 110 and luminaires included in the room with sight of the system controller 110. Again, luminaries outside the room 110 cannot communicate with the system controller 110 as the room walls block the IR signals. Of course, any combination of RF, IR and sonar signals may be used to detect the luminaires 120 located in the room 110. As needed, synchronization signals may also be communicated between the system controller 110 and the luminaires for more precise determination of time of arrival, time of flight or other information.

In another embodiment, the detected luminaires 120 may be provided to the user for inspection and acceptance for example on a display 160 of the system controller 130, such as in the form of a list or in the form of a diagram indicating the room and the detected luminaires 120. For a more precise diagram of the room 110, sonar signals transmitted by the system controller 130 or a separate transmitter may be used to detect the room walls and construct a substantially precise map of the room. The position of the detected luminaires 120 may also be displayed in substantially precise positions on the map, particularly when triangulation is used to detect the luminaire positions, for example.

The displayed map of the room including the luminaire may be presented to the user for verification and acceptance prior to allowing the displayed luminaire to join the limited network 110. The user may modify the map, such as move the mapped wall and/or luminaire positions on the screen 160, such as by dragging them to better represent the room and detected luminaires 120.

Alternatively, the user may add a new luminaire to the limited network 110 and/or to the displayed map, such as by turning off all the room luminaires except the new one so that the ID of the luminaire is transmitted to the system controller and associated with the limited network 150. Of course, instead of turning off the remaining lights, the user may simply cause the new luminaire to transmit its unique ID such as by turning on the lights associated with the new luminaire, for example, or causing the luminaire to enter a commissioning mode where its ID is transmitted to system controller 130 with or without its associated lights being on. In this case, the new luminaire may or may not be in the room 110 in order to be associated with or join the limited network 150 as the user wishes.

The user may also be provided with other manual intervention options, where the user or system controller 130 sequentially controls selected luminaires, which are (or suspected to be) in the room 110, and sequentially turns ON the lights. Each time a luminaire or light is turned on, the system controller 130 waits for user input whether to allow or reject the ON luminaire from joining the limited network 150. The system controller 130 may be configured to prevent an ON luminaire from joining the network if a user input is not received within a predetermined time, such as when the ON luminaire is in a different room and the user may not realize or see that that luminaire in ON and thus may delay providing in input to the system controller 130.

Based on the detected elements within a local area, such as a room, which are allowed to join the limited network 150, the system controller 130 may be configured to automatically commission and assign a proper control application. For example, if only a switch 170 and a motion detector 180 are found in the room 110 in addition to luminaires 120, the proper control application will be manual on and auto-off. This manual on and auto-off application for room 110 is automatically configured by the system controller 130 or a master controller associated with many rooms, such as the entire floor or the entire building. As another example, if a switch was not found in that space or room, the proper commissioning application for such a room will be auto-on/off of the luminaires 120 under the control of the motion detector 180.

The network system 100 alleviate the need for manual commissioning of lighting system, as the network formation is limited to single spaces and the application is chosen based on sensors found, such as auto on/off, or manual on/auto off as described above.

Thus, commissioning of lighting system for example is rendered automatic, where upon initiation of the automatic commissioning mode of the system control 130, it communicates with available devices, such as controllable devices like the luminaires or light sources 120 and controlling devices such as the switch 170 and the motion sensor 180. As described, the system control 130 is configured to determine which devices are within a space such as the room 110 and only allows those devices to join the limited network 150 associated with the room 110. In addition to wirelessly communicating their IDs, the room devices 120, 170, 180 also communicate to the system control 130 their type, capabilities, and/or specification. Thus, the controller knows that device 120 is a luminaire having a light source that may be dimmable and/or color changeable etc., and the device 170 is a switch having particular characteristics, such as being a dimming switch, a one-way or two-way switch and the like, and that device 180 is motion detector.

Based on the collection of devices in the room 110 that are allowed and have joined the limited network 150, the system control 130 automatically configures itself and/or controlling device such as the switch 170 and motion detector 180 to properly control the controllable devices, such as the luminaires 120. Accordingly, installation and commissioning of control systems are simplified and no longer require skilled technicians.

Any kind of wireless communication may be used whether based on RF, IR, sonar, such
a short range wireless link, including Bluetooth, Zigbee and the like. Further, a memory 190 may be operationally coupled to the system controller 130 for storing data, such as location of walls and communicating elements, including operating system and application data to be accessed and executed by the processor to achieve desired functions and results. Of course, any other device or element may have processors and memories as needed.

The luminaires or light sources 120 may be any type of light sources with controllers, drivers and/or ballasts, such as LEDs incandescent, fluorescent, halogen, or high intensity discharge (HID) light and the like. The light sources 120 may be controllable to provide light of any desired attribute(s), such as colors, intensity, hue, saturation, beam width, spot size and other attributes.

Of course, as it would be apparent to one skilled in the art of communication in view of the present description, various elements may be included such as a light source controller which may be separate or integrated with the processor. The controllable light source includes drivers and may also include other elements, such as elements for wireless communication and control including one or more transmitters, receivers, or transceivers, antennas, modulators, demodulators, converters, duplexers, filters, multiplexers etc., which may also be included or coupled to the processor or controller for wireless light control. Such well-known elements are not described in detail in order not to obscure description of the present system and method.

As is well-known, the system controller or processor 130 executes instruction stored in the memory 190, for example, which may also store other data, such as predetermined or programmable settings related to control of the light source (s), including programmable grouping of lights and light attributes/settings to illuminate related, relevant or desired products, such as intensity (i.e., dimming function), color, hue, saturation, beam width, direction, color temperature, mixed colors, and the like, for the case of light source that may be controlled to change attributes of light emanating therefrom.

It should be understood that the various component of the interaction system may be operationally coupled to each other by any type of link, including wired or wireless link(s), for example. Various modifications may also be provided as recognized by those skilled in the art in view of the description herein. The memory 190 may be any type of device for storing application data as well as other data. The application data and other data are received by the controller or processor for configuring it to perform operation acts in accordance with the present systems and methods.

The operation acts of the present methods are particularly suited to be carried out by a computer software program, such computer software program preferably containing modules corresponding to the individual steps or acts of the methods. Such software can of course be embodied in a computer-readable medium, such as an integrated chip, a peripheral device or memory, such as the memory or other memory coupled to the processor of the controller or light module.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory 190.

Additional memories may also be used. The computer-readable medium, the memory 190, and/or any other memories may be long-term, short-term, or a combination of long- and-short term memories. These memories configure the processor/controller 130 to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory, for instance, because the processor may retrieve the information from the network.

The processor 130 and the memory 190 may be any type of processor/controller and memory, such as those described in U.S. 2003/0057887, which is incorporated herein by reference in its entirety. The processor may be capable of providing control signals and/or performing operations to automatically commission the lighting or other systems based on detecting location of system elements and wall separating various elements. The processor may execute instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Each of the above systems utilized for identifying the presence and identity of the user may be utilized in conjunction with further systems.

The system controller 130, e.g., associated with the room 110, may communicate with a master controller of various rooms, an entire floor and/or entire building, or portions thereof. The system controller may also be configured to detect the removal of an element in the room 110 or the limited network 150 and re-configure or re-commission the remaining elements of the limited network 150. The various elements may be separate or integrated with other elements. For example, various sensors, transceivers and the like, may be mounted in the luminaires instead of being separate elements. It should be understood that the local area 110 need not be enclosed or partitioned by walls or partitions, and may be defined by other means, such as by the user for example, where various elements may be grouped together, manually or automatically in response to user input for example.

Of course, it is to be appreciated that any one of the above embodiments or processes may be combined with one or with one or more other embodiments or processes to provide even further improvements in finding and matching users with particular personalities, and providing relevant recommendations.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts or steps is intended to be required unless specifically indicated.

The invention claimed is:

1. A network system comprising:
a plurality of controllable devices, wherein at least one controllable device of said plurality of controllable devices is located within a local area; and
a controller configured to communicate with said plurality of controllable devices and to join said at least one controllable device to a local network associated with said local area, while preventing remaining controllable devices of said plurality of controllable devices from being associated with said local network; said controller being further configured to sequentially activate at least a subset of said plurality of controllable devices and prevent at least one activated controllable device from joining said local network in response to a user input.

2. The network system of claim 1, further comprising a plurality of controlling devices configured to control said plurality of controllable devices, at least one controlling device being joined to said local network, wherein said controller is further configured to automatically reconfigure at least one of itself and said at least one controlling device based on a number and type of said plurality of controlling devices allowed to join said local network.

3. The network system of claim 1, further comprising a switch and a motion sensor that are allowed to join said local network, wherein said controller configures said switch to enable manual activation of said at least one controllable device by the user.

4. The network system of claim 1, further comprising a motion sensor that is allowed to join said local network, wherein said controller configures said motion sensor to enable automatic activation and de-activation of said at least one controllable device based at least on presence and absence of motion within said local area.

5. The network system of claim 1, wherein said controller is configured to distinguish said at least one controllable device among said plurality of controllable devices by at least one of RF signals, IR signals and sonar signals communicated between said controller and at least one controllable device.

6. The network system of claim 1, wherein said controller is configured to distinguish said at least one controllable device among said plurality of controllable device by at least one of IR signals and sonar signals communicated between said controller and at least one controllable device.

7. The network system of claim 1, wherein said controller is configured to distinguish said at least one controllable device among said plurality of controllable device by RF signals communicated between said controller and said at least one controllable device using at least one of time of flight and received signal strength of at least one of said RF signals.

8. A method of forming a limited network of controllable devices comprising the acts of:
enabling communication with a plurality of controllable devices;
detecting at least one controllable device located within a local area among said plurality of controllable devices; and
joining said at least one controllable device in a local network associated with said local area, while preventing remaining controllable devices of said plurality of controllable devices from being associated with said local network;
sequentially activating at least a subset of said plurality of controllable devices; and
preventing at least one activated controllable device from joining said local network in response to a user input.

9. The method of claim 8, further comprising the acts of:
communicating with a plurality of controlling devices configured to control said plurality of controllable devices;
determining at least one controlling device of said plurality controlling devices joined in said local area; and
reconfiguring said at least one controlling device to control said at least one controllable device.

10. The method of claim 9, wherein said at least one controlling device is reconfigured based on a number and type of said plurality of controlling devices that are allowed to join said local network.

11. The method of claim 8, wherein said determining act comprises detecting said at least one controllable device by at least one of RF signals, IR signals and sonar signals.

12. The method of claim 8, wherein said determining act comprises detecting said at least one controllable device by at least one of time of flight and received signal strength of at least one of said signal transmitted by said at least one controllable device.

* * * * *